Patented June 5, 1923.

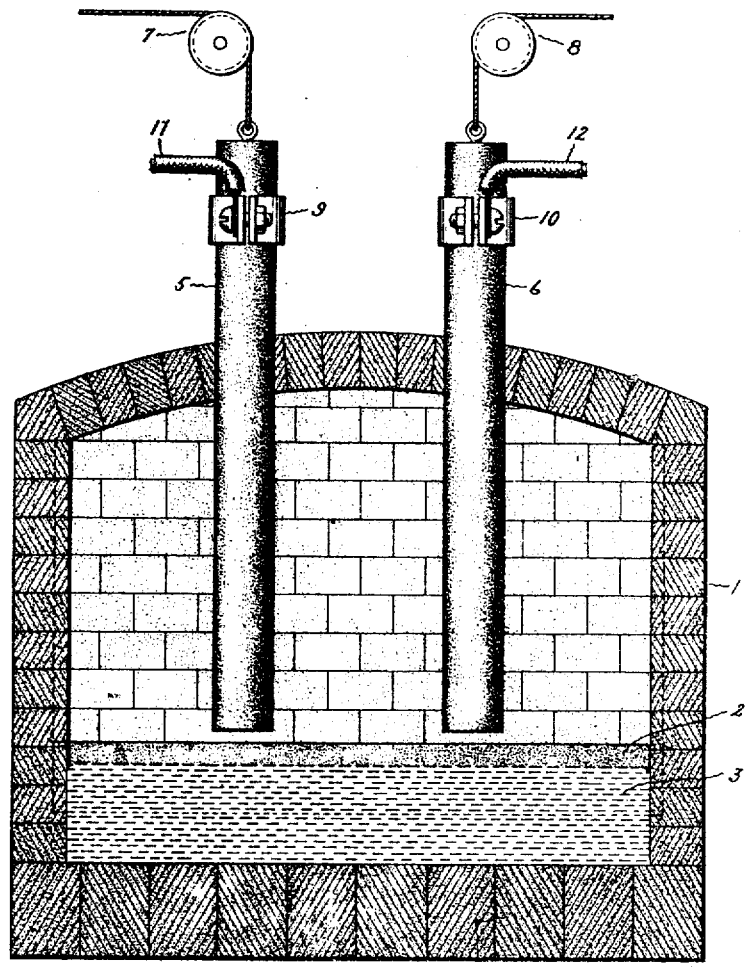

1,457,718

UNITED STATES PATENT OFFICE.

IRVING R. VALENTINE, OF ERIE, PENNSYLVANIA, ASSIGNOR TO GENERAL ELECTRIC COMPANY, A CORPORATION OF NEW YORK.

ELECTRIC FURNACE.

Application filed May 5, 1921. Serial No. 467,102.

*To all whom it may concern:*

Be it known that I, IRVING R. VALENTINE, a citizen of the United States, residing at Erie, in the county of Erie, State of Pennsylvania, have invented certain new and useful Improvements in Electric Furnaces, of which the following is a specification.

The present invention relates to electric furnaces and comprises in particular a furnace suitable for melting metals of relatively low melting point as, for example, brass, aluminum and copper.

In my prior Patent No. 1,242,275, of October 9, 1917, I have described and claimed a furnace in which a charge is heated indirectly by an electric arc, the heat being conveyed to the charge mostly by reflection from the walls of the container and only to a relatively small extent by direct conduction. In the furnace embodying my present invention heat is conveyed to the charge more largely by direct conduction than in the furnace disclosed in my prior patent.

A preferred embodiment of my invention is illustrated in section in the accompanying drawing.

The furnace here shown comprises a vaulted container 1 consisting of suitable refractory brick. Near the base of the container but spaced away therefrom is a block 2 consisting of refractory heat conductive material, such, for example, as graphite. Ordinarily this block 2 is located in a fixed position at such height from the floor of the furnace that it will be in direct contact with the charge 3 consisting of brass or the like but it may be arranged to be movable and to float in the molten charge. One or more electrodes 5, 6, project through the roof of the furnace and extend into arcing relation to the block 2. Suitable hoisting and electrode regulating mechanism is provided as indicated at 7, 8. Current-conveying terminals are indicated at 9, 10 connected to conductors 11, 12. In the arrangement illustrated two arcs preferably are operated in series but various other arrangements within the scope of my invention will readily suggest themselves. The block 2 preferably should have a size adapted to shield the charge from the direct heating effect of the electric arc or arcs.

In the operation of my improved furnace the block 2 is heated by the arc or arcs but due to its mass the temperature attained by the block is not excessively high and does not cause volatilization of the charge as would be the case if the arc or arcs were to play directly upon or above the charge. Some heat is conveyed to the charge by reflection. Due to the intimate contact of the block with the charge and the short thermal path therein a high heating efficiency is attained.

What I claim as new and desire to secure by Letters Patent of the United States, is:—

1. An electric furnace comprising a receptacle adapted to contain molten charge, a refractory, heat conducting solid body therein located above a charge in said receptacle and in close thermal relation thereto and means for heating said body by one or more electric arcs.

2. An alectric furnace comprising a receptacle, a refractory, heat conducting body therein, located to be immersed in part at least in a molten charge in said receptacle, and means for heating said body by an electric arc maintained out of direct radiating relation with said charge.

3. An electric furnace comprising a receptacle, a block of graphite spaced away from the bottom of said receptacle in position to impart heat by conduction to a body of charge in said receptacle, and one or more electrodes adapted to coact with said block to maintain an arc or arcs whereby said block may impart heat by conduction to said charge.

4. An electric furnace comprising a receptacle, a refractory, solid conducting body in said receptacle adapted to float in a molten charge contained therein, and electrical means for heating said body.

5. An electric furnace comprising a receptacle, a body of carbonaceous material adapted to float in a molten charge contained therein, and a plurality of electrodes adapted to operate in arcing relation with said body.

6. An electric furnace comprising a receptacle, a solid, refractory conductor therein located to come into direct contact with a charge in said receptacle, and means for electrically heating said conductor thereby imparting heat to said charge.

In witness whereof, I have hereunto set my hand this 3rd day of May, 1921.

IRVING R. VALENTINE.